(No Model.) 3 Sheets—Sheet 2.
G. W. McNEAR.
CLOSED CONDUIT FOR ELECTRIC RAILWAYS.
No. 505,605. Patented Sept. 26, 1893.
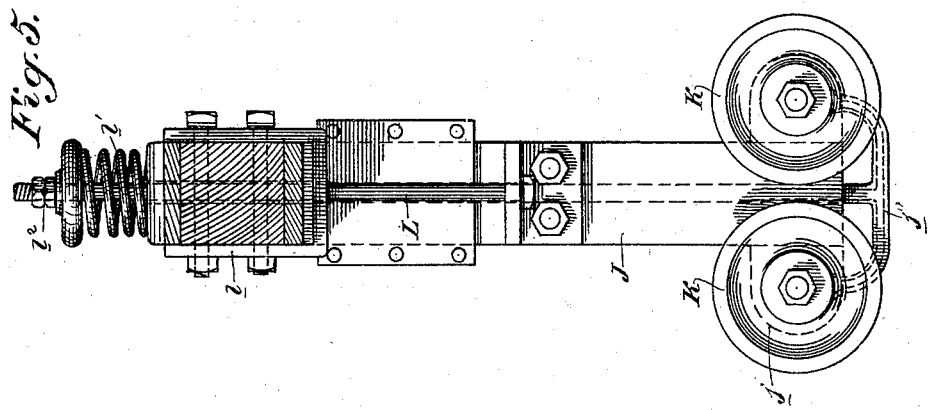
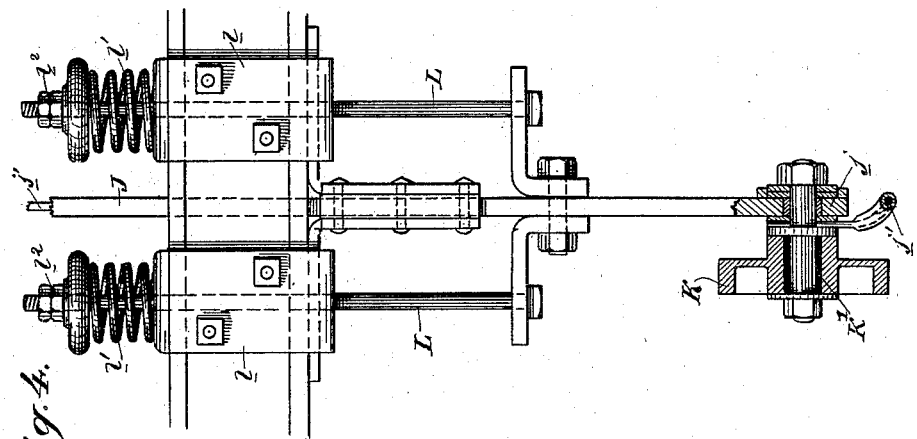
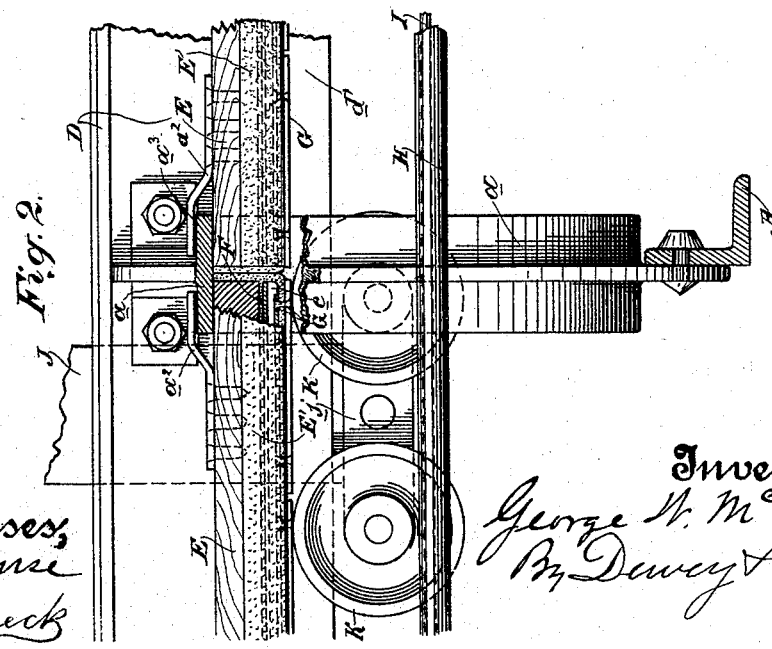
Witnesses,
Inventor,
George W. McNear
By Dewey & Co.
Atty (No Model.) 3 Sheets—Sheet 3.

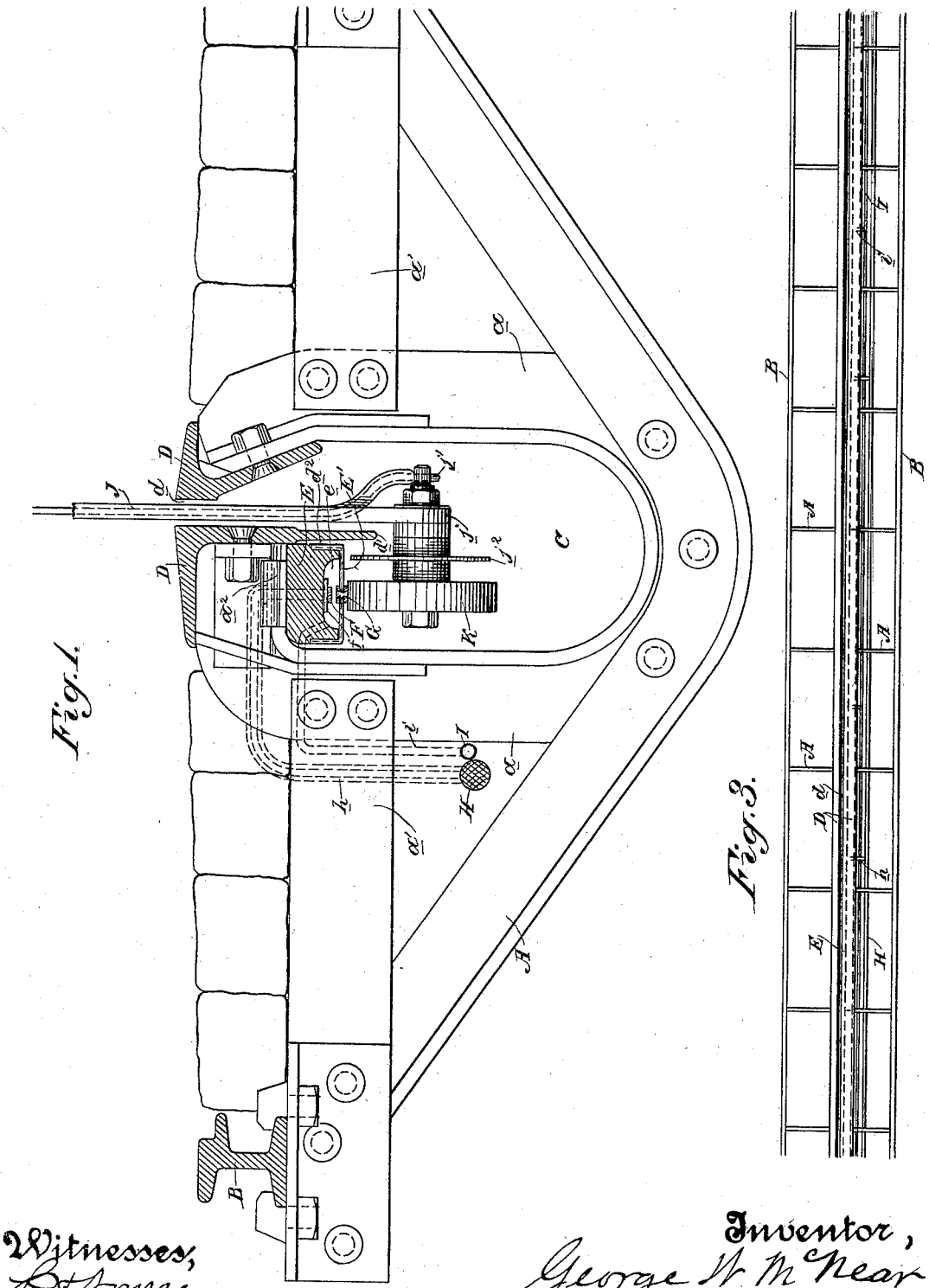

G. W. McNEAR.
CLOSED CONDUIT FOR ELECTRIC RAILWAYS.

No. 505,605. Patented Sept. 26, 1893.

Witnesses:

Inventor,
George W. McNear
By Dewey & Co.
Attys

UNITED STATES PATENT OFFICE.

GEORGE W. McNEAR, OF OAKLAND, CALIFORNIA.

CLOSED CONDUIT FOR ELECTRIC RAILWAYS.

SPECIFICATION forming part of Letters Patent No. 505,605, dated September 26, 1893.

Application filed August 1, 1892. Serial No. 441,866. (No model.)

*To all whom it may concern:*

Be it known that I, GEORGE W. MCNEAR, a citizen of the United States, residing in Oakland, county of Alameda, State of California, have invented an Improvement in Electric Railways; and I hereby declare the following to be a full, clear, and exact description of the same.

My invention relates to that class of conduit electric railways in which the conductor is confined within a collapsible insulating envelope or sack which carries a series of contact pieces exposed interiorly and exteriorly, and normally out of contact with the conductor, and a trolley, traveling in outer contact with said pieces, forces them into electrical connection with the confined conductor, said contacts returning to their normal position by the expansion of the insulating envelope after the trolley has passed. This class is exemplified by my prior Letters Patent, No. 462,014, dated October 27, 1891, and my present invention consists mainly in new and useful improvements in the construction of the conduit and its contained parts, and in the trolley and means for mounting and carrying it. These improvements will be hereinafter fully described and specifically pointed out in the claims.

The general objects of my invention are to provide a conduit electric railway in which the construction of the conduit and its contained parts will be of a simple, durable and effective character, permitting repairs and substitution of parts without inconvenience or interruption of travel; to provide also for a thorough and effective insulation of the conductor; and finally to provide for the passage of the car from the conduit system to the overhead system, easily and rapidly.

Particular objects will appear in connection with the description of the several constructions which I shall now proceed to give.

Figure 6:
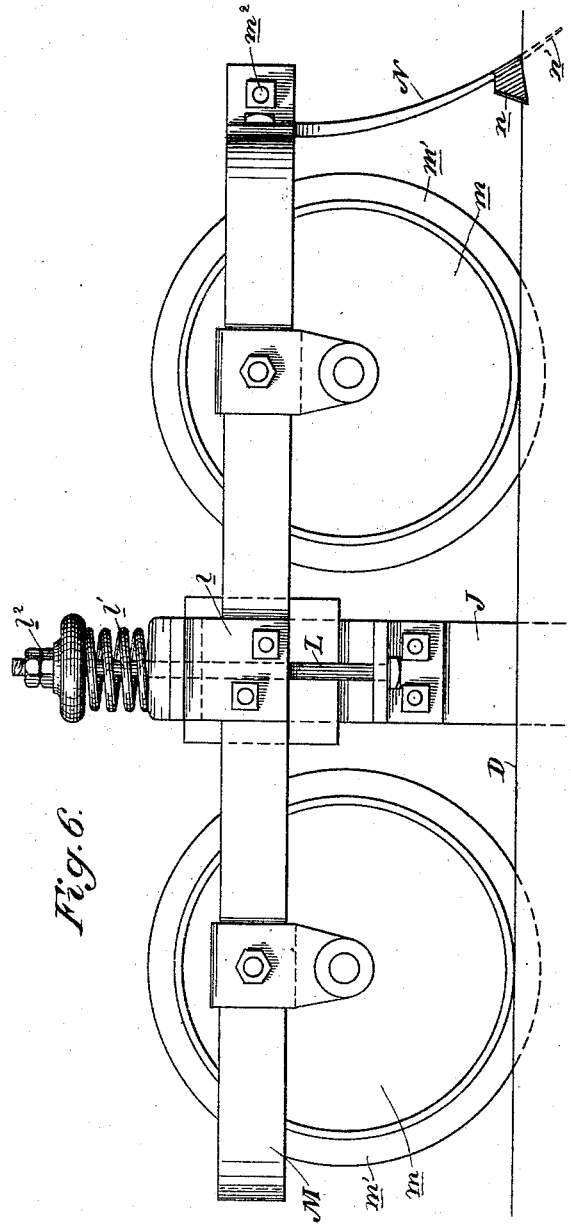
Figure 7:
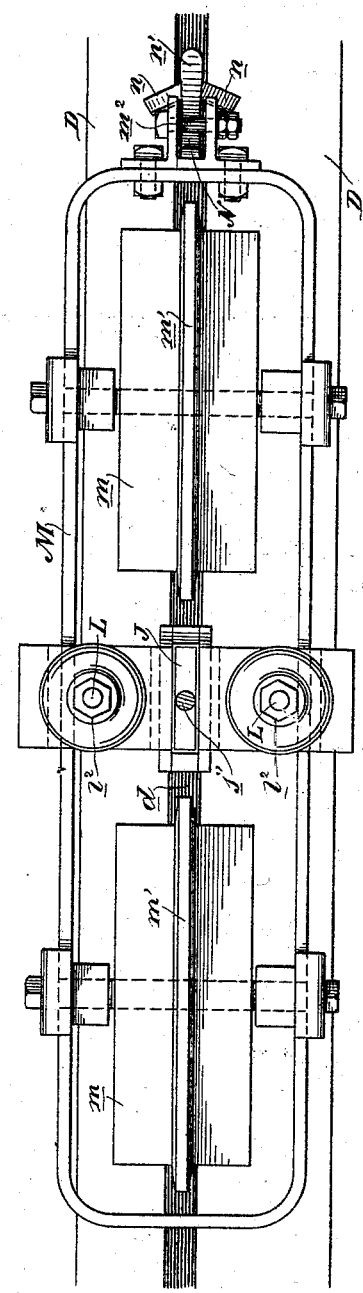

Referring to the accompanying drawings for a more complete explanation of my invention,—Figure 1 is a cross section of the road-bed and conduit. Fig. 2 is a side view of the same. Fig. 3 is a plan of the road-bed. Fig. 4 is an edge view of the trolley. Fig. 5 is a side elevation of the same. Fig. 6 is a side elevation showing the trolley mounted upon a separate carriage to be trailed by the car. Fig. 7 is a plan view of the same.

In a suitable excavation or ditch made in the roadway are placed at proper intervals the yokes A which support the track rails B at their extremities. Rising from the bases of these yokes are the conduit arms $a$ which form the contour of the conduit C, and which also carry the slot rails D between which the slot $d$ is formed. The arms $a$ are further secured to the yokes A by the horizontal braces $a'$, the whole forming a type of conduit yoke familiar in the construction of cable railways. Between these yokes, in the excavation or ditch in the roadway, is to be filled in a body of concrete in the usual manner, and upon which is supported the pavement.

The arms $a$ of the conduit consist, as shown in Figs. 1 and 2, of a wide central rib and oppositely extending flanges at right angles, the former receiving and carrying the slot rails D which are removably bolted thereto, while the flanges have resting on their tops at each side, as shown in Fig. 2, the brackets $a^2$ which rest upon the flanges through the intervention of a piece of insulating material $a^3$.

Secured to the brackets $a^2$ by means of suitable bolts or screws, is a longitudinally extending strip or bar E which may consist of any suitable material, metallic or otherwise. In case it be metallic, it will be suitably covered with insulating material, but I prefer to make it of insulating material in the first instance, and for this purpose hard rubber or vulcanite, or preferably wood, will be found best. This piece or strip has its under side $e$ hollowed out or concaved as shown in Fig. 1, and to the center of this concaved portion is secured in a suitable manner, the electrical conductor F through the intervention of a suitable insulating strip $f$. To this strip or bar is secured a flexible diaphragm E', the edges of which are fitted to the sides of the strip or bar, said diaphragm crossing the concave under side thereof, whereby a space is formed between said bar and diaphragm, the two thus constituting a continuous collapsible sack or envelope in which the electrical conductor is confined. This diaphragm may be of any suitable, flexible, insulating material such as soft rubber or some chemical or mechanical combination thereof having insulating properties and sufficiently flexible to allow it to collapse and expand. In this diaphragm are fitted the contact strips G which project inside and outside so that their inner surfaces are exposed interiorly and their outer exteriorly. These strips may be single pieces projecting through the diaphragm, or separate pieces exposed inside and outside and in contact with each other, either directly or by metallic rivets, or other conducting connection. These contact strips are in pieces separated from each other at their ends and of short length, sufficient to allow the wheels of the trolley to be always in contact with one of them, and to permit the proper collapsing and expansion of the diaphragm. The collapsible envelope or sack thus formed, lies wholly under the top of one side of the conduit and out of line of the vertical plane of the slot $d$ whereby it is perfectly insulated; and to further this insulation it will be observed that the slot rail D on that side, is extended down vertically and has a reduced or narrowed extension $d'$ separated from the envelope or sack by an air space $d^2$ which is of itself a good non-conductor. This extension further provides for carrying the drip of surface water, dust and dirt beyond or past the envelope or sack and into the bottom of the conduit from which it can be removed, the liquid portions by suitable drains and the solid portions by scraping, access being had to the conduit through suitable manholes as usual. It is the design of this construction to permit the removal of the parts forming the envelope or sack through the top of the conduit by first removing the slot rails from their supporting arms of the yokes. For this purpose in construction, the space between the adjacent upper ends of the arms $a$ will be sufficiently large to permit the removal through it of the strip or bar E and its diaphragm.

Although, if desired, the sack or envelope may be a continuous unbroken one and the conductor which it carries likewise continuous or unbroken, or in sections united intimately while still providing for expansion and contraction, it will be found best in the practical construction of the road to make these parts in wholly independent sections of any suitable or convenient length. Thus, in Fig. 2, I have shown the adjacent ends of two separate sections of the envelope and of separate sections of the electrical conductor wholly independent of one another, the flexible diaphragm at these adjacent ends being drawn up fully around the end of the strip or bar E, thereby completely inclosing the hollow interior of the sack or envelope. Thus, in this construction, the sack or envelope and the conductor, will be composed of a series of wholly independent sections which provide for the ready and easy removal of any one section without affecting the remainder. Thus, repairs and substitution may be carried on with no inconvenience whatever. In such a case where the sack or envelope and the electrical conductor are made in independent sections it will be necessary to provide a main supply conductor with feed wires to the electrical conductor F of each section. Accordingly, in Fig. 1, I have shown as embedded in the body of the roadway a main supply conductor H from which extend feed wires $h$ suitably insulated and having their other ends extending into the envelope or sack, and forming electrical connection with the electrical conductor F therein in each section of said envelope or sack. This sectional construction and the feeding from the main supply conductor are shown in Fig. 3.

Although it is the intention to so construct the flexible diaphragm of the envelope or sack as to permit its return to normal position, after being collapsed by the passage of the trolley by its own elasticity or by gravity, it may be found desirable to insure this return by means of a slight compression due to a confined body of air, under pressure, within the sack or envelope. To provide for this I have here shown as embedded in the body of the roadway, a tube or pipe I, which may be supposed to have communication with a source of air pressure and which throughout its length has feed pipes $i$ extending to the several sections of the envelope or sack whereby a light pressure of air of ordinary temperature or superheated, is maintained therein which will positively insure the return of the diaphragm to its normal position, and the separation of its contact pieces from the electrical conductor. This confined body of air is also of itself a good non-conductor.

In Figs. 1 and 2, I have shown the lower portion of the trolley. J is the shank of the trolley which passes down through the slot $d$ of the conduit and carries at its lower end a cross foot $j$ upon the extremities of which are mounted, with suitable insulating protection, the trolley wheels K which lie directly under the contact pieces G of the flexible diaphragm of the envelope or sack. A suitable wire $j'$ passes down to these wheels and is properly insulated throughout its course, the other end of said wire extending suitably to the car motor. A shield $j^2$ of some insulating material may be placed on the trolley wheel supporting axis to prevent the drip from working outward to said wheel. The trolley wheels are suitably insulated from the shank as is shown in Fig. 4 by means of the sleeve or bushing K, which may be made of vulcanite or other insulating material, and said shank is carried by the car above through the intervention of spring connections which hold the wheels up and cause them to travel continuously against the contact strips, collapsing the diaphragm and keeping the strips in contact with the conductor. The current is turned on and off by a suitable device on the car above.

The spring connection is shown clearly in Figs. 4 and 5. With the shank J are connected the side rods L which pass upwardly through suitable boxes $l$ carried on the truck above and receive springs $l'$ on their upper ends, the tension of which is regulated by nuts $l^2$. These springs hold the trolley wheels up in contact with the contact pieces G of the flexible diaphragm, and cause them to follow this contact accurately through all variations of travel. The trolley may be carried by the car itself upon any portion thereof, as upon a portion of the truck frame, but in some instances it will be desirable to carry it upon a separate carriage or truck adapted to be trailed under or behind the car. This device I have shown in Figs. 6 and 7, by referring to which it will be seen that M is the frame of a truck which is provided with centrally disposed wheels $m$ having central peripheral flanges $m'$, said flanges being adapted to travel in the slot $d$ of the conduit, while the face of the wheels travels upon the slot rails thereof. The trolley is secured to the truck frame M in the manner heretofore described and as illustrated by Figs. 4 and 5.

One end of the truck frame M is provided with a fastening connection $m^2$ adapting it to be connected to the car which carries the motor, it being understood that the wire from the trolley will extend to the motor. The independent carriage M is thus trailed along behind or under the car and when a portion of the road is reached which employs an overhead wire, the carriage M is simply and easily disconnected from the car whereupon the latter proceeds by means of its overhead trolley. This trailing of an independent trolley carriage results, in connection with the sectional construction of the envelope or sack, and the conductor, in the further advantage of carrying the car over any section undergoing repairs or substitution, by simply allowing the trolley carriage when such section is reached, to trail far enough in the rear to remain on the adjacent section until the car has passed over the incomplete one, and then drawing said carriage up to its place again.

N is a slot clearer. It consists of an iron secured to the trolley carriage and having its lower end provided with wings $n$ to travel on the surface of the slot rails and clear them, and with a central point $n'$ to travel in the slot to force obstructions therefrom.

Having thus described my invention, what I claim as new, and desire to secure by Letters Patent, is—

1. In an electric railway, the combination of the conduit arms $a$ of the yokes, the brackets $a^2$ resting on one side of said arms, the insulating strip or bar E carried by said brackets and having a hollowed out or concave lower side, and the flexible insulating diaphragm secured to the strip or bar and crossing its hollow or concave side whereby an envelope or sack is formed for the electrical conductor and contact strips, substantially as herein described.

2. In an electric railway, the combination of the conduit arms $a$ of the yokes, the brackets $a^2$ resting on one side of said arms, the insulating strip or bar E carried by said brackets and having a hollowed out or concave lower side, the flexible insulating diaphragm secured to the strip or bar and crossing its hollow or concave side whereby an envelope or sack is formed, the electrical conductor in the lower side of the bar or strip, and the opposing contact strips carried by the flexible diaphragm, substantially as herein described.

3. In an electric railway, the combination of the conduit arms of the yokes, the removable slot irons carried by said arms, the brackets $a^2$ secured to one side of the conduit arms and the envelope or sack carried by said brackets for containing the electrical conductor and contact strips, said envelope or sack consisting of the insulating strip or bar with hollowed lower side, and the transverse insulating flexible diaphragm secured across said side, substantially as herein described.

4. In an electric railway, a collapsible sack or envelope for confining an electrical conductor and carrying opposing contacts normally out of contact with said conductor but adapted to be thrown into contact therewith by the collapsing of the sack, a means for maintaining a pressure of air within said envelope or sack to insure the return of the sack from its collapsed condition, consisting of an air pipe connected with a source of air pressure and having connections with the interior of said envelope or sack, substantially as herein described.

5. In a conduit electric railway and in combination with a frame carrying the trolley, said frame having supporting wheels traveling on the slot rails and with flanges traveling in the slot, an arm secured to said frame and having wings on its lower end moving upon said rails in advance of the trolley shank and a point moving in the slot, substantially as herein described.

In witness whereof I have hereunto set my hand.

GEORGE W. McNEAR.

Witnesses:
S. H. NOURSE,
WM. F. BOOTH.